United States Patent
Wang (10) Patent No.: US 11,249,653 B2
(45) Date of Patent: Feb. 15, 2022

(54) APPARATUS AND METHOD FOR STORING IMAGE DATA IN A STORAGE BASED ON INFORMATION REGARDING A NUMBER OF WRITES

(71) Applicant: CANON KABUSHIKI KAISHA, Tokyo (JP)

(72) Inventor: Xiaoli Wang, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/938,799

(22) Filed: Jul. 24, 2020

(65) Prior Publication Data

US 2021/0034253 A1 Feb. 4, 2021

(30) Foreign Application Priority Data

Jul. 31, 2019 (JP) .............................. JP2019-141509

(51) Int. Cl.
*H04N 1/00* (2006.01)
*G06F 3/06* (2006.01)

(52) U.S. Cl.
CPC ............ *G06F 3/0616* (2013.01); *G06F 3/068* (2013.01); *G06F 3/0634* (2013.01); *G06F 3/0659* (2013.01); *H04N 1/0009* (2013.01); *H04N 1/00034* (2013.01); *H04N 1/00079* (2013.01); *H04N 1/00411* (2013.01); *H04N 1/00474* (2013.01); *H04N 1/00824* (2013.01)

(58) Field of Classification Search
CPC ................ G06F 3/0616; H04N 1/0009; H04N 1/00034; H04N 1/00824
See application file for complete search history.

(56) References Cited

U.S. PATENT DOCUMENTS

| | | | |
|---|---|---|---|
| 2010/0214586 A1* | 8/2010 | Suzuki | G06F 9/441 358/1.13 |
| 2016/0060069 A1* | 3/2016 | Miyahara | H04N 1/00639 358/3.28 |
| 2016/0170692 A1* | 6/2016 | Osada | H04N 1/2104 358/1.15 |
| 2018/0203623 A1* | 7/2018 | Imamura | G06F 11/2082 |
| 2018/0210679 A1* | 7/2018 | Hikichi | G06F 3/122 |
| 2018/0329654 A1* | 11/2018 | Ikazaki | G06F 3/122 |
| 2019/0034769 A1* | 1/2019 | Arazaki | G06K 15/1817 |
| 2019/0227919 A1* | 7/2019 | Nitta | G06F 9/3004 |

FOREIGN PATENT DOCUMENTS

JP 2017-134604 A 8/2017

* cited by examiner

*Primary Examiner* — Benjamin O Dulaney
(74) *Attorney, Agent, or Firm* — Canon U.S.A., Inc. IP Division

(57) ABSTRACT

An apparatus includes a volatile first storage and a nonvolatile second storage with a limited number of writes, and the apparatus includes a printer configured to execute printing based on image data, and a controller having one or more processors which execute instructions stored in one or more memories, the controller being configured to acquire information about a number of writes of the second storage, and switch between a first operating mode of storing the image data in the second storage and a second operating mode of storing the image data in the first storage and not storing the image data in the second storage based on the information about the number of writes.

20 Claims, 8 Drawing Sheets

| ID | AttributeName | Current | Worst | Threshold |
|---|---|---|---|---|
| 1 | Read Error Rate | | | |
| 3 | Spin - Up Time | | | |
| 4 | Start / Stop Count | | | |
| 5 | Reallocated Sectors | | | |
| ... | ... | | | |
| 177 | P / E Cycle | | | |
| ... | ... | | | |

FIG.6B

| DATA NAME | SIZE | FREQUENCY | LEVEL OF IMPORTANCE | NORMAL OPERATION STORAGE DESTINATION | DEGENERACY OPERATION STORAGE DESTINATION |
|---|---|---|---|---|---|
| IMAGE DATA | LARGE | HIGH | LOW | SSD | RAM |
| USER SETTING VALUE | SMALL | LOW | MIDDLE | SSD | SSD |
| LICENSE INFORMATION | SMALL | LOW | MIDDLE | SSD | SSD |
| ... | ... | ... | ... | ... | ... |
| BILLING INFORMATION | SMALL | HIGH | HIGH | SSD | SSD |

… # APPARATUS AND METHOD FOR STORING IMAGE DATA IN A STORAGE BASED ON INFORMATION REGARDING A NUMBER OF WRITES

BACKGROUND OF THE INVENTION

Field of the Invention

The aspect of the embodiments relates to an image forming apparatus in which a storage device with a limited number of writes is installed.

Description of the Related Art

In a multifunction printer (hereinafter, image forming apparatus), a magnetic device (hereinafter, hard disk device (HDD)) is used as a storage device in many cases. Image data resulting from scanning performed by a user can be stored in the HDD, and printing can be performed using the stored image data. If the data is thus temporarily stored in the HDD, a plurality of documents can be read by one scan, and a plurality of sheets or copies can be printed based on the read documents.

Meanwhile, as a nonvolatile flash memory such as a solid state drive (SSD) has become widespread, the SSD is installed in place of the HDD in a personal computer (PC) of recent years in an increasing number of cases. The SSD is faster than the HDD, and storing a system program in the SSD increases speed of system operation. However, the SSD is a device having a life in terms of the number of writing times depending on the characteristics of a NOT-AND (NAND) element included in the SSD. When the SSD reaches the end of life, the SSD enables only reading (read-only) because of the characteristics of the NAND element.

In a configuration discussed in Japanese Patent Application Laid-Open No. 2017-134604, an image forming apparatus includes both an SSD and an HDD as storage devices and switches a write destination for data between the SSD and the HDD depending on the type of the data. Further, there is discussed a configuration in which the HDD is used as a backup destination for data to be written to the SSD, and if there is access to the HDD during the backup to the HDD, the access to the HDD is assigned a higher priority.

SUMMARY OF THE INVENTION

According to an aspect of the embodiments, an apparatus includes a volatile first storage and a nonvolatile second storage with a limited number of writes, and the apparatus includes a printer configured to execute printing based on image data, and a controller having one or more processors which execute instructions stored in one or more memories, the controller being configured to acquire information about a number of writes of the second storage, and switch between a first operating mode of storing the image data in the second storage and a second operating mode of storing the image data in the first storage and not storing the image data in the second storage based on the information about the number of writes.

Further features of the disclosure will become apparent from the following description of exemplary embodiments with reference to the attached drawings.

DESCRIPTION OF THE EMBODIMENTS

Exemplary embodiments of the disclosure will be described with reference to the attached drawings. The following exemplary embodiments are not intended to limit the disclosure set forth in the claims, and not all combinations of features described in the exemplary embodiments are necessarily indispensable to a solution of the disclosure.

Figure 1:
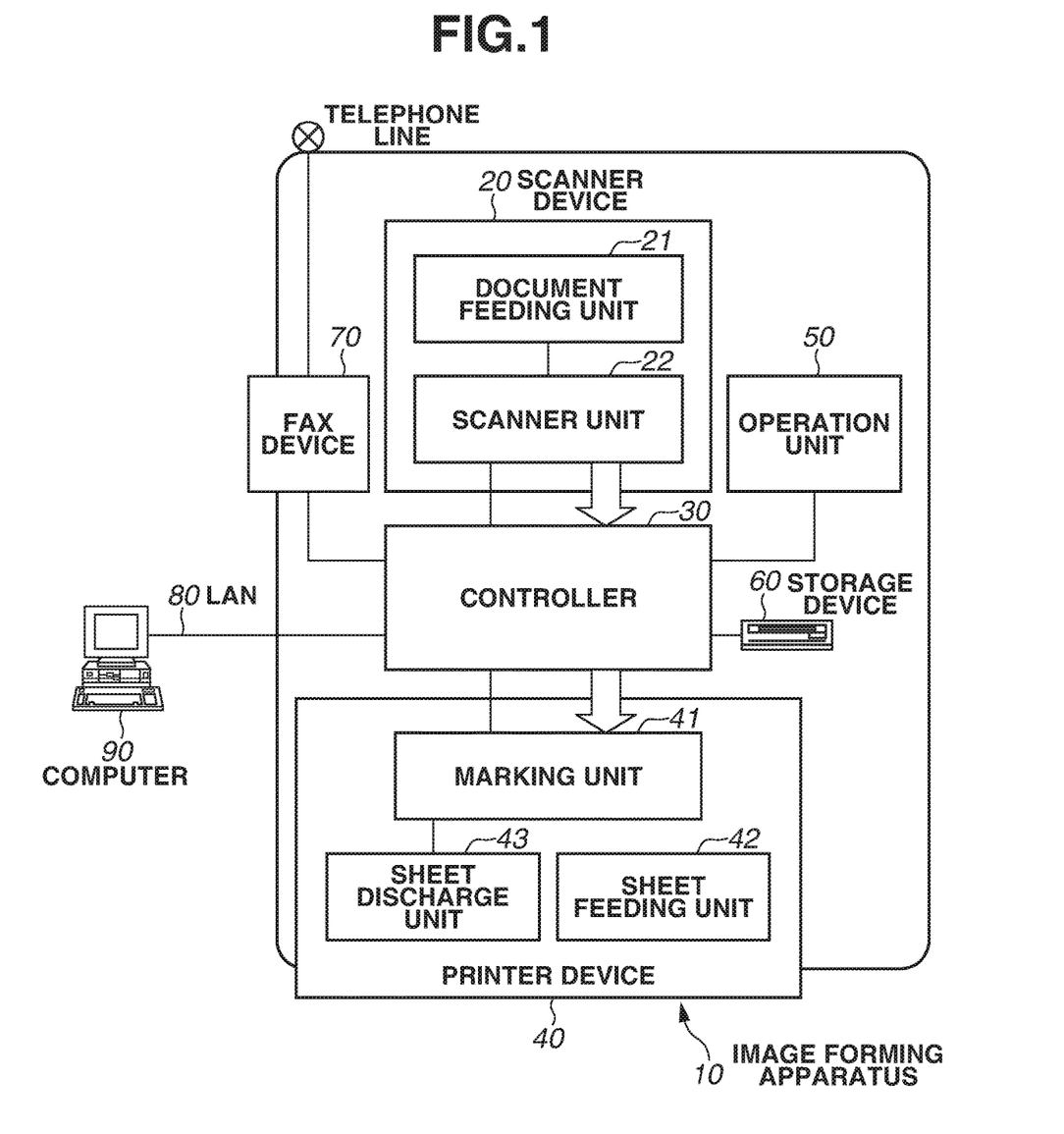
FIG. 1 is a block diagram illustrating an image forming system.

A first exemplary embodiment will be described. FIG. 1 is a block diagram illustrating an image forming system. An image forming apparatus 10 includes a scanner device 20, a printer device 40, an operation unit 50, a storage device 60, a fax device 70, and a controller 30.

The scanner device 20 includes a document feeding unit 21 that can automatically and sequentially replace one document with another in a bundle, and a scanner unit 22 that can optically scan a document and convert the document into a digital image. The scanner device 20 optically reads an image from the document and generates image data based on the read image. The generated image data is transmitted to the controller 30.

The printer device 40 includes a sheet feeding unit 42 that can feed sheets one by one from a sheet bundle, a marking unit 41 for printing image data on the fed sheet, and a sheet discharge unit 43 for discharging the printed sheet. The printer device 40 outputs image data generated by the scanner device 20 or image data received from an external apparatus to a paper medium.

The operation unit 50 receives an operation performed on the image forming apparatus 10 by a user. The operation unit 50 may be included in a display that displays information for the user. The storage device 60 stores, for example, a digital image and a control program. The fax device 70 transmits a digital image to, for example, a telephone line.

The controller 30 is connected to each module, and controls execution of a job in the image forming apparatus 10 by issuing an instruction to each module.

The image forming apparatus 10 communicates with a computer 90 that is an external apparatus via a local area network (LAN) 80. Thus, the image forming apparatus 10 can receive image data from and output image data to the computer 90 via the LAN 80, and receive, for example, an issued job and an instruction for a device via the computer 90.

The above-described configuration of the image forming system enables the image forming apparatus 10 to execute various jobs. For example, in a copy function, the scanner device 20 reads a document and stores image data generated thereby in the storage device 60. Based on the stored image data, printing on a sheet is performed using the printer device 40. For example, in an image transmission function, image data generated by the scanner device 20 is transmitted to the computer 90 via the LAN 80. In an image storage function, image data generated by the scanner device 20 is stored in the storage device 60. The stored image data can be transmitted to an external apparatus based on an operation by the user or can be printed on a sheet. In an image printing function, for example, a page-description language is analyzed and printing is performed by the printer device 40 based on data transmitted from the computer 90.

Figure 2:
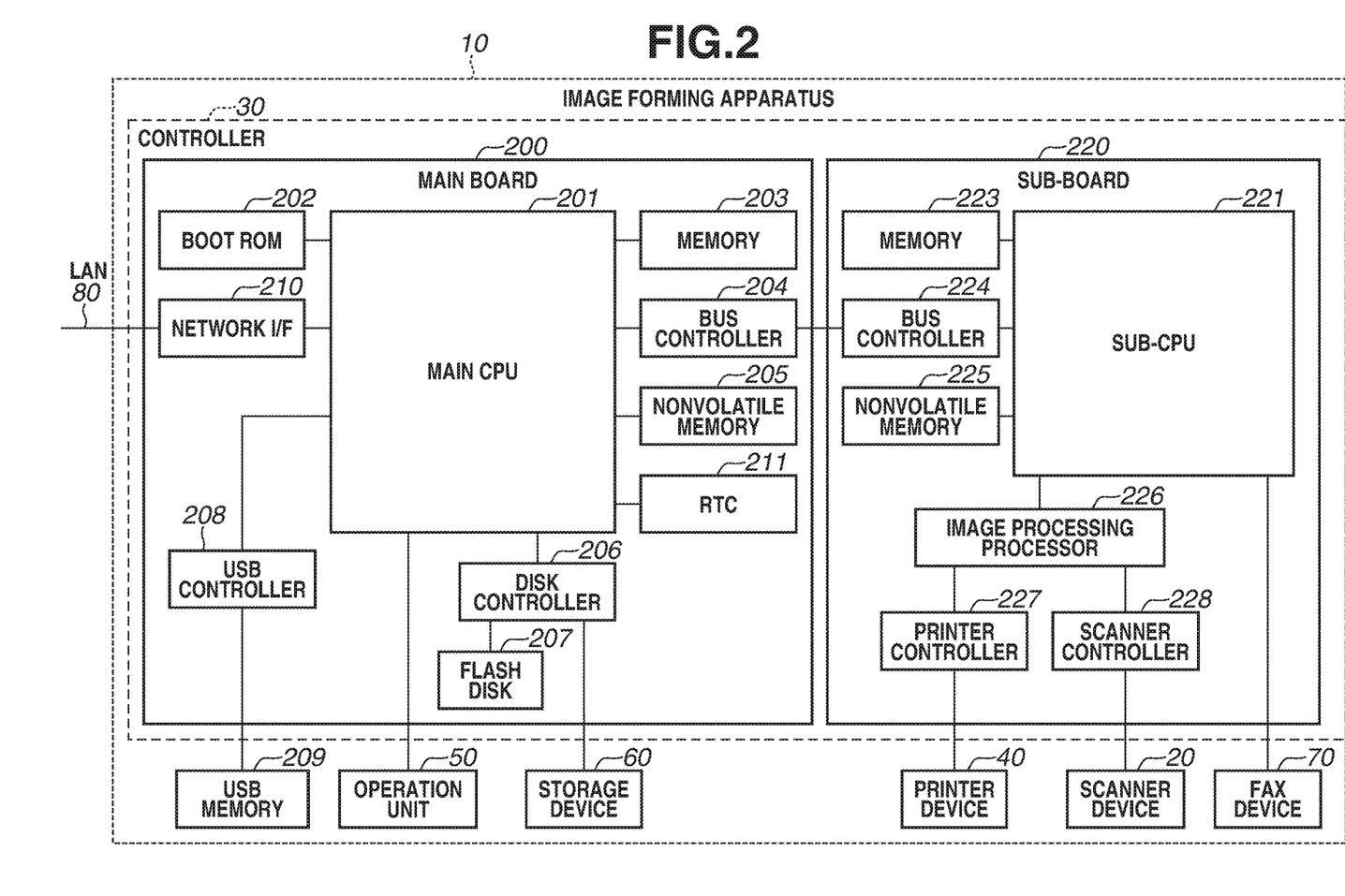
FIG. 2 is a block diagram illustrating an image forming apparatus.

FIG. 2 is a block diagram illustrating a configuration example of the image forming apparatus 10 according to the present exemplary embodiment. The image forming apparatus 10 includes the controller 30, the scanner device 20, the printer device 40, the operation unit 50, the storage device 60, and the fax (facsimile) device 70 connected to the controller 30. The scanner device 20 optically reads an image from a document, converts the read image into a digital image, and outputs the digital image as image data. The printer device 40 prints an image on a sheet (such as a recording sheet) based on image data. The operation unit 50 includes an operation button and a display panel having a touch panel function, and is used to receive a user operation for the image forming apparatus 10 and is used to display various kinds of information and operation screens. The fax device 70 transmits the image data to a designated destination by fax transmission via the telephone line.

The storage device 60 is a nonvolatile storage device, and stores image data and programs such as a control program and an application program to be executed by a main central processing unit (CPU) 201. The storage device 60 may also be referred to as an auxiliary storage device. In the image forming apparatus 10 of the present exemplary embodiment, a hard disk drive (HDD) or a solid state drive (SSD) can be installed as the storage device 60. The SSD is a nonvolatile storage device including a semiconductor device (e.g., a NOT-AND (NAND) flash memory), and enables faster random access than the HDD although a storage capacity of the SSD is less than that of the HDD.

The controller 30 includes a main system (main board) 200 and a subsystem (sub-board) 220. The main system 200 is a CPU system for controlling the entire image forming apparatus 10. The subsystem 220 is a CPU system connected to the main system 200 and including hardware for image processing. Devices such as the operation unit 50 and the storage device 60 are connected to the main system 200. Devices such the scanner device 20, the printer device 40, and the fax device 70 are connected to the subsystem 220.

The main system 200 includes the main CPU 201, a boot read-only memory (ROM) 202, a memory 203, a bus controller 204, a nonvolatile memory 205, and a disk controller 206. The main system 200 further includes a network interface (I/F) 210 and a real-time clock (RTC) 211.

The main CPU 201 controls the entire main system 200 and also controls the entire image forming apparatus 10. The boot ROM 202 stores a boot program to be executed by the main CPU 201 when the image forming apparatus 10 is activated. The memory 203 is used as a work memory of the main CPU 201. The bus controller 204 has a bridge function with respect to an external bus (in the present exemplary embodiment, a bus of the subsystem 220). The nonvolatile memory 205 stores data such as setting data to be used by the main CPU 201. The RTC 211 has a clock function. The disk controller 206 controls the storage device 60.

A Universal Serial Bus (USB) controller 208 controls readout of data from and writing of data to a USB memory 209. The USB memory 209 is a detachably attached external storage device.

The subsystem 220 includes a sub-CPU 221, a memory 223, a bus controller 224, a nonvolatile memory 225, an image processing processor 226, a printer controller 227, and a scanner controller 228. The sub-CPU 221 controls the entire subsystem 220 under control of the main CPU 201.

The memory 223 is a volatile memory and is used as a work memory of the sub-CPU 221. The bus controller 224 has a bridge function with respect to an external bus (in the present exemplary embodiment, a bus of the main system 200). The nonvolatile memory 225 stores data such as setting data to be used by the sub-CPU 221.

The image processing processor 226 performs image processing on image data to be output to the printer device 40 and image data input from the scanner device 20.

The printer controller 227 passes image data between the image processing processor 226 and the printer device 40, and controls the printer device 40 based on an instruction from the sub-CPU 221.

The scanner controller 228 passes image data between the image processing processor 226 and the scanner device 20, and controls the scanner device 20 based on an instruction from the sub-CPU 221. The fax device 70 is directly controlled by the sub-CPU 221.

Figure 3:
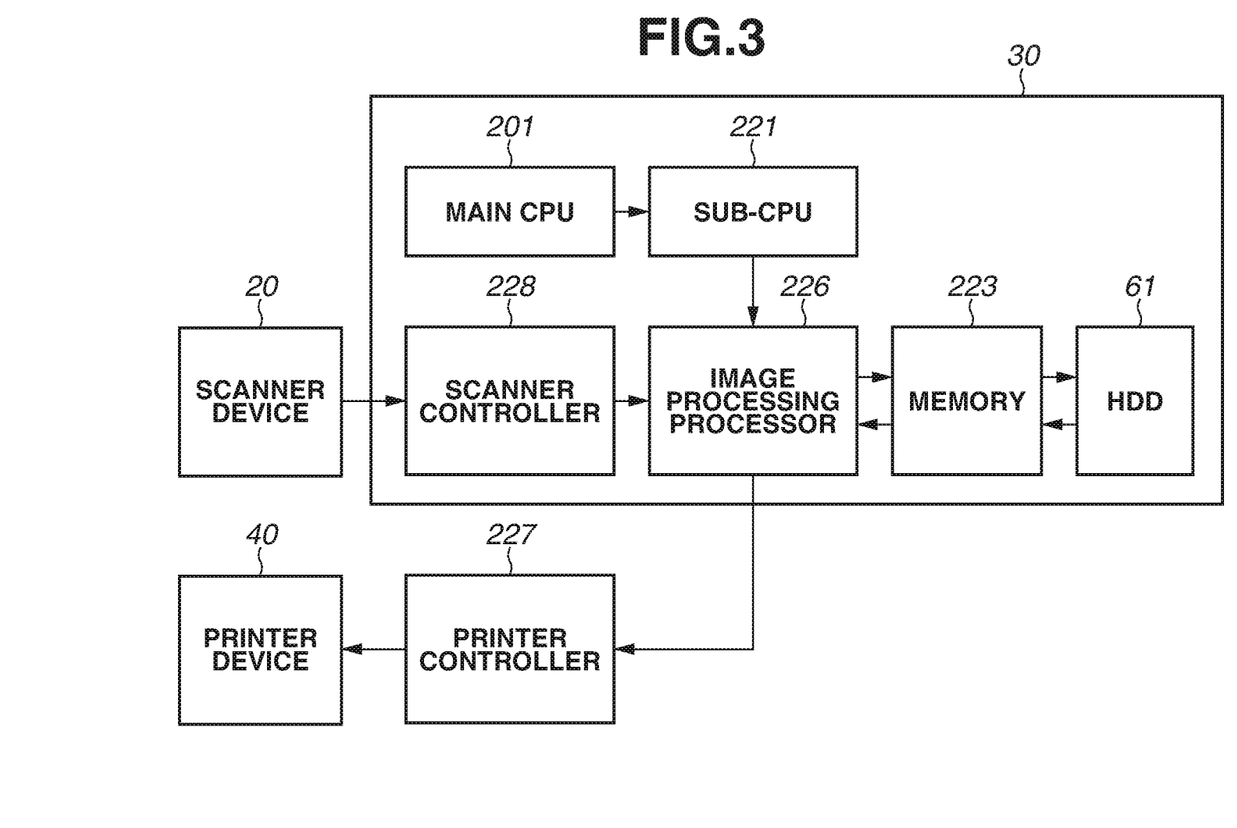
FIG. 3 is a block diagram illustrating copy operation.

FIG. 3 illustrates a copy-related hardware configuration and copy operation representing a flow of image data during copy execution in a conventional technology. Here, a configuration using an HDD 61 as the storage device 60 in FIG. 2 will be described.

When a user provides an instruction for image copy using the operation unit 50, the main CPU 201 sends an image reading command to the scanner controller 228.

This causes the scanner device 20 to optically scan a paper document and convert the paper document into digital image data. The scanner device 20 temporarily stores the digital image data in the memory 223 via the scanner controller 228 and the image processing processor 226. The image data stored in the memory 223 is stored in the HDD 61. The image data stored in the HDD 61 is read out by the main CPU 201 and input into the image processing processor 226 via the memory 223.

The image processing processor 226 performs image processing such as rotation, expansion, and reduction on the image data. The main CPU 201 issues an instruction for performing direct memory access (DMA) transfer of the image data processed by the image processing processor 226 to the memory 223, and the memory 223 temporarily stores the digital image data.

Upon confirming completion of storage of a fixed amount or all of the digital image data into the memory 223, the main CPU 201 issues an image output instruction to the image processing processor 226 via the sub-CPU 221.

The sub-CPU 221 notifies the image processing processor 226 of the position of the image data in the memory 223. The image data in the memory 223 is transmitted to the printer device 40 via the image processing processor 226 and the printer controller 227 based on a synchronization signal from the printer device 40, and the printer device 40 prints the image data on a paper medium.

In a case where a plurality of copies is to be printed, the main CPU 201 stores image data held in the memory 223 in the storage device 60 so that the image data can be read out from the storage device 60 and transmitted to the printer device 40 for the second and subsequent copies.

A capacity of the memory 223 is relatively small in many cases, and therefore, temporarily stored image data is stored in the HDD 61. In printing, the disk controller 206 reads out the image data stored in the HDD 61 to be loaded into the memory 223, and the printing is performed based on the read-out data.

Here, the configuration in which the image data read by the scanner device 20 is printed is described, but a configuration in which print data is received from an external apparatus such as a personal computer (PC) may be used. In that case, the received print data is input into the image processing processor 226, and afterward, the data is processed in a manner similar to that in the above-described configuration.

Figure 4:
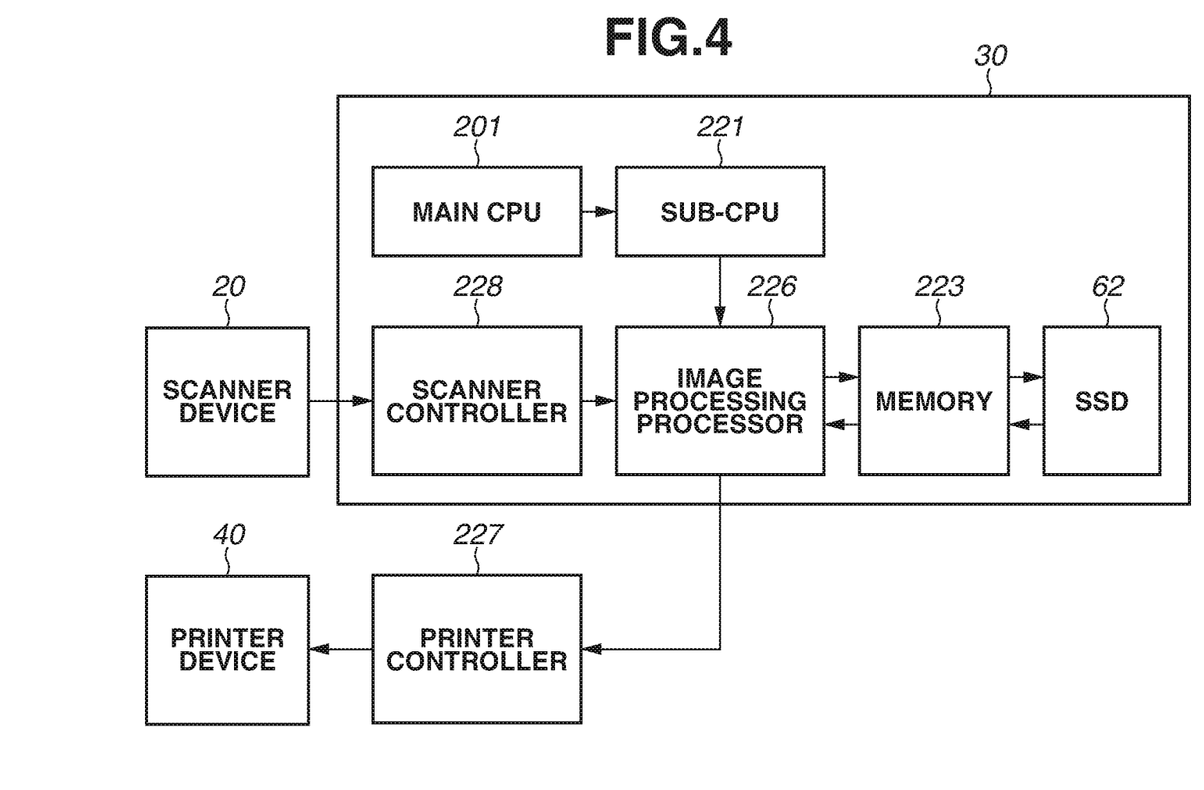
FIG. 4 is a block diagram illustrating copy operation.

Next, a copy-related hardware configuration and copy operation representing a flow of image data during copy execution in a case where a solid state drive (hereinafter, an SSD 62) is used as the storage device 60 will be described with reference to FIG. 4. The SSD 62 has such a characteristic that the SSD 62 is faster than the HDD 61, and therefore, installing the SSD 62 can speed up writing to/reading from a storage. Thus, it is possible to increase the operating speed of the image forming apparatus 10 by installing the SSD 62 in the image forming apparatus 10. Here, a different from FIG. 3 will be described.

In the case of the SSD 62, in printing, the disk controller 206 reads out image data stored in the SSD 62 to be loaded into the memory 223, and the printing is performed based on the read-out image data. Upon completion of the printing, the main CPU 201 causes the disk controller 206 to erase the printed image data stored in the SSD 62.

The SSD 62 stores not only image data generated by the scanner device 20, but also data used for operating the image forming apparatus 10, such as system data. In one embodiment, data used for operating the image forming apparatus 10 is written to the SSD 62. However, the number of writes is limited in the SSD 62. This is because a NAND element deteriorates each time erasure/writing is performed and eventually becomes unable to store data. In general, an SSD controller brings an SSD into a read-only state when the number of writes exceeds the limit. There is a possibility that the SSD 62 is brought into a read-only state and thus the image forming apparatus 10 cannot be used.

Figure 5A:
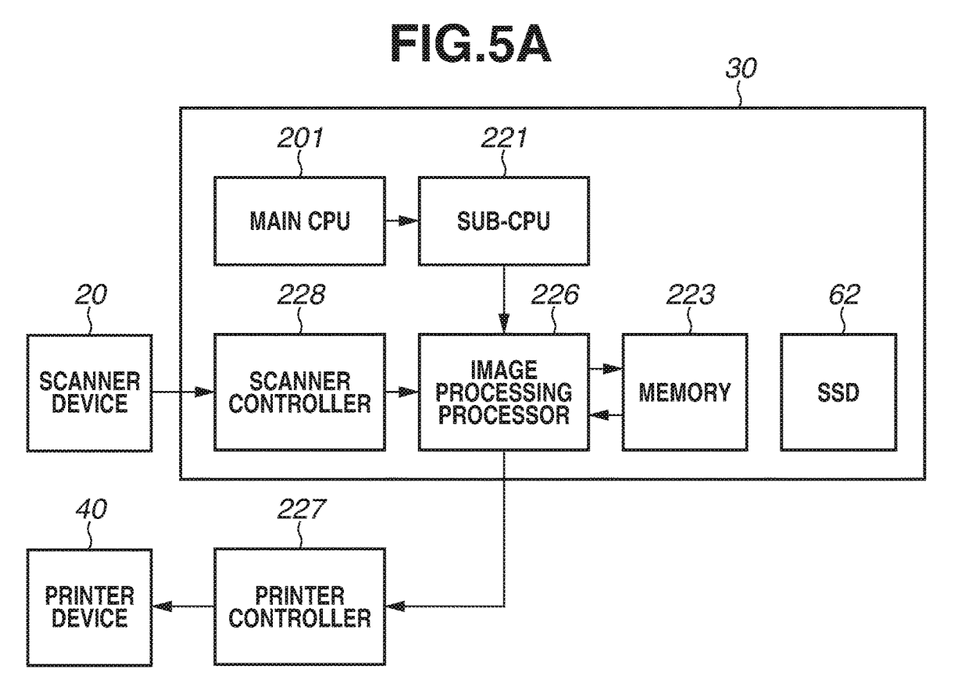
FIGS. 5A and 5B are block diagrams each illustrating copy operation.

A copy-related hardware configuration and copy operation representing a flow of image data during copy execution according to the present exemplary embodiment will be described with reference to FIG. 5A.

Figure 6A:
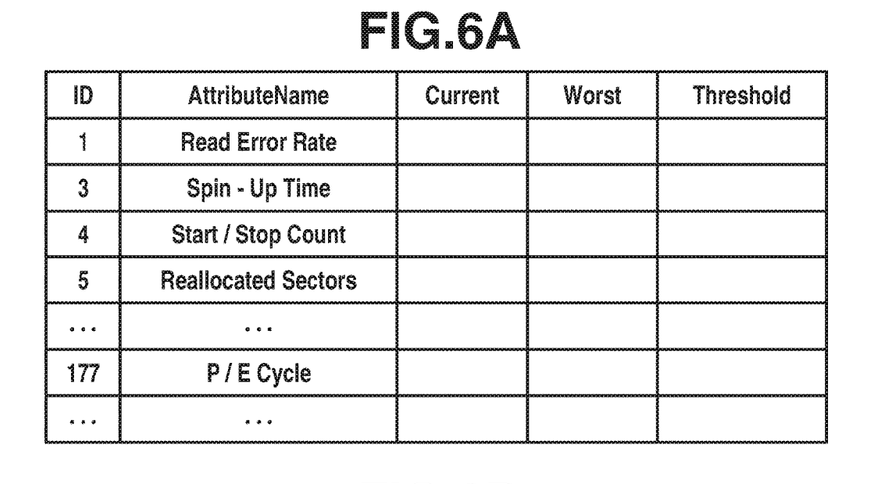
FIGS. 6A and 6B are block diagrams each illustrating an example of information related to a nonvolatile storage.

The main CPU 201 monitors the life (the total number of writes) of the SSD 62. Checking of the life of the SSD 62 will be described in detail with reference to FIG. 6A. FIG. 6A illustrates Self-Monitoring, Analysis and Reporting Technology information (hereinafter, SMART information). The SMART information is a function intended for early detection of a trouble and failure prediction of a device. The main CPU 201 acquires the SMART information from the SSD 62, so that the main CPU 201 can detect the life of the SSD 62.

The SMART information includes one hundred or more attributes including attributes common to manufactures and specifications uniquely predefined by a manufacture. FIG. 6A illustrates an example of the SMART information. The first column indicates an identifier (ID) of each attribute of the SMART information. The second column indicates a meaning of each attribute. For example, an attribute corresponding to ID 1 is Read Error Rate (an error rate in reading), and an attribute corresponding to ID 3 indicates Spin-Up Time (startup and stop time of a device). An attribute corresponding to ID 177 indicates the number of writes (consumed life). Alternatively, the attribute corresponding to ID 177 may indicate the number of writes allowed (remaining life).

The third column indicates a value of each attribute of the SMART information. The fourth column indicates a worst value of each attribute of the SMART information (e.g., in the case of ID 3, the worst value of the startup time up to now is indicated). The fifth column indicates a threshold of each attribute of the SMART information (e.g., in the case of ID 177, an occurrence of a failure is determined if the number of erasures is a predetermined number or more).

The example in which the main CPU 201 determines the life by checking the remaining life described in the attribute corresponding to ID 177 is described, but the way of determining the life is not limited to this example. The life may be determined based on information described in an attribute corresponding to another ID in the SMART information.

The description continues referring back to FIG. 5A. In a case where the life consumption of the SSD 62 is small, the main CPU 201 performs the copy operation described with reference to FIG. 4 (normal operation). In contrast, in a case where the life consumption of the SSD 62 is large (e.g., 90% or more), the main CPU 201 stores image data generated by the scanner device 20 in only the memory 223 without using the SSD 62. This is because the size of the image data is large and the storage frequency thereof is high, whereby the image data greatly consumes the life in terms of the number of writes to the SSD 62.

In this way, the life consumption of the SSD 62 can be reduced since the data that greatly consumes the life in terms of the number of writes such as the image data is not written to the SSD 62. However, in such a configuration, if the scanner device 20 sequentially scans a plurality of documents and generates a plurality of pieces of image data based on the scanned documents, it is highly likely that the generated image data cannot be stored in the memory 223 because the capacity of the memory 223 is small. In this case, the scanner device 20 performs, for example, as follows. First, the scanner device 20 generates image data corresponding to one document and stores the generated image data in the memory 223. The image data stored in the memory 223 is extracted, and printing of the image data is performed based on the extracted image data. Subsequently, the data stored in the memory 223 is deleted. Upon the deletion of the data stored in the memory 223, the scanner device 20 scans the next document. These processes are repeated until no document to be read by the scanner device 20 remains (degeneracy operation).

In this way, in a case where the consumption of the life of the SSD 62 is large, the degeneracy operation for storing image data to be used in printing in only the memory 223 is executed. In other words, the image data to be used in printing is not stored in the SSD 62.

Even if the life consumption of the SSD 62 is large (e.g., 90% or more), the main CPU 201 may store the data in the SSD 62. Next, data that can be stored in the SSD 62 will be described.

Figure 5B:
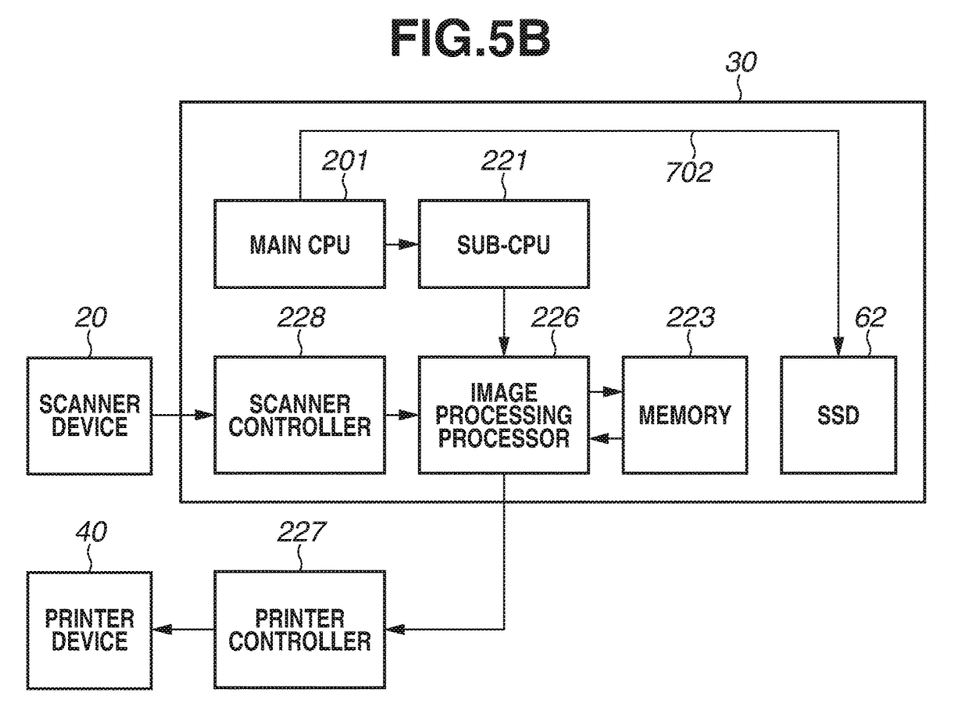

FIG. 5B is a diagram illustrating data to be stored in the SSD 62 even if the life consumption of the SSD 62 is large.

As described above, if the life of the SSD 62 is consumed for a predetermined amount or more, the image forming apparatus 10 performs the degeneracy operation in which the image data is written to the memory 223 without being written to the SSD 62. However, the memory 223 is not suitable for use as an area for storing important data since the memory 223 is a volatile memory and data held therein is lost when the image forming apparatus 10 is turned off.

It is desirable to store such data in a nonvolatile memory so that the data is not lost even if the image forming apparatus 10 is turned off or even if an instantaneous power interruption occurs. Thus, as illustrated in FIG. 5B, the main CPU 201 uses the SSD 62 as a storage destination for the important data even during the degeneracy operation. In such a configuration, it is possible to hold the important data in the SSD 62 while suppressing a decrease in the life of the SSD 62 by not storing the image data in the SSD 62.

In a case where the life of the SSD 62 is not consumed for the predetermined amount or more (during the normal operation), the main CPU 201 can store the important data while ensuring the processing speed of the copy operation by storing both the image data and the important data in the SSD 62.

Examples of the important data here include billing information and various setting values of the user (e.g., personal settings, an email transmission destination to be used when scanning is performed, a language setting corresponding to a use area, a repair history, and a permitted function). In particular, the billing information in the SSD 62 is stored because the billing information is information about a sum of money used by the user and is to be stored with accuracy.

Figure 6B:
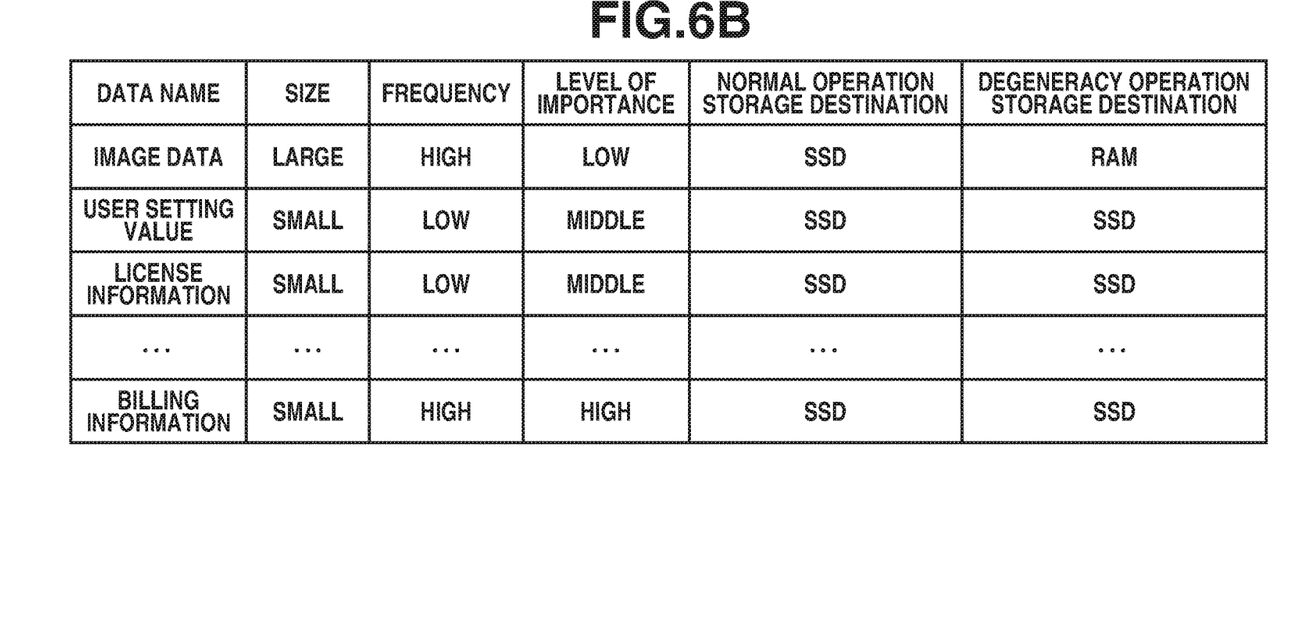

FIG. 6B illustrates correspondence between a storage destination and each data type. Since the size of image data is relatively large (tens to 200 megabytes per page) and the image data is written to a storage each time page processing is performed in the execution of a job, the image data is stored in an SSD during the normal operation and stored in a RAM during the degeneracy operation.

Other than the image data, there are data types such as user setting information (e.g., a transition time for transition to a low power consumption mode, double-sided printing), license information (e.g., whether a specific function is permitted), and billing information (e.g., the number of printed sheets). Among the data types, there is a data type involving frequent writes, such as the billing information, although it has a small data amount to be written to a storage medium (several bytes). Thus, even if a write occurs, an influence of the write on the life (hundreds of terabytes) of the SSD 62 is small.

In the present exemplary embodiment, the configuration in which data with a middle or high level of importance is stored in the SSD during the degeneracy operation is described, but other configurations may be used. For example, the storage destination for data during the degeneracy operation may be set based on a comprehensive determination in terms of the level of importance, the size, and the frequency.

Figure 7:
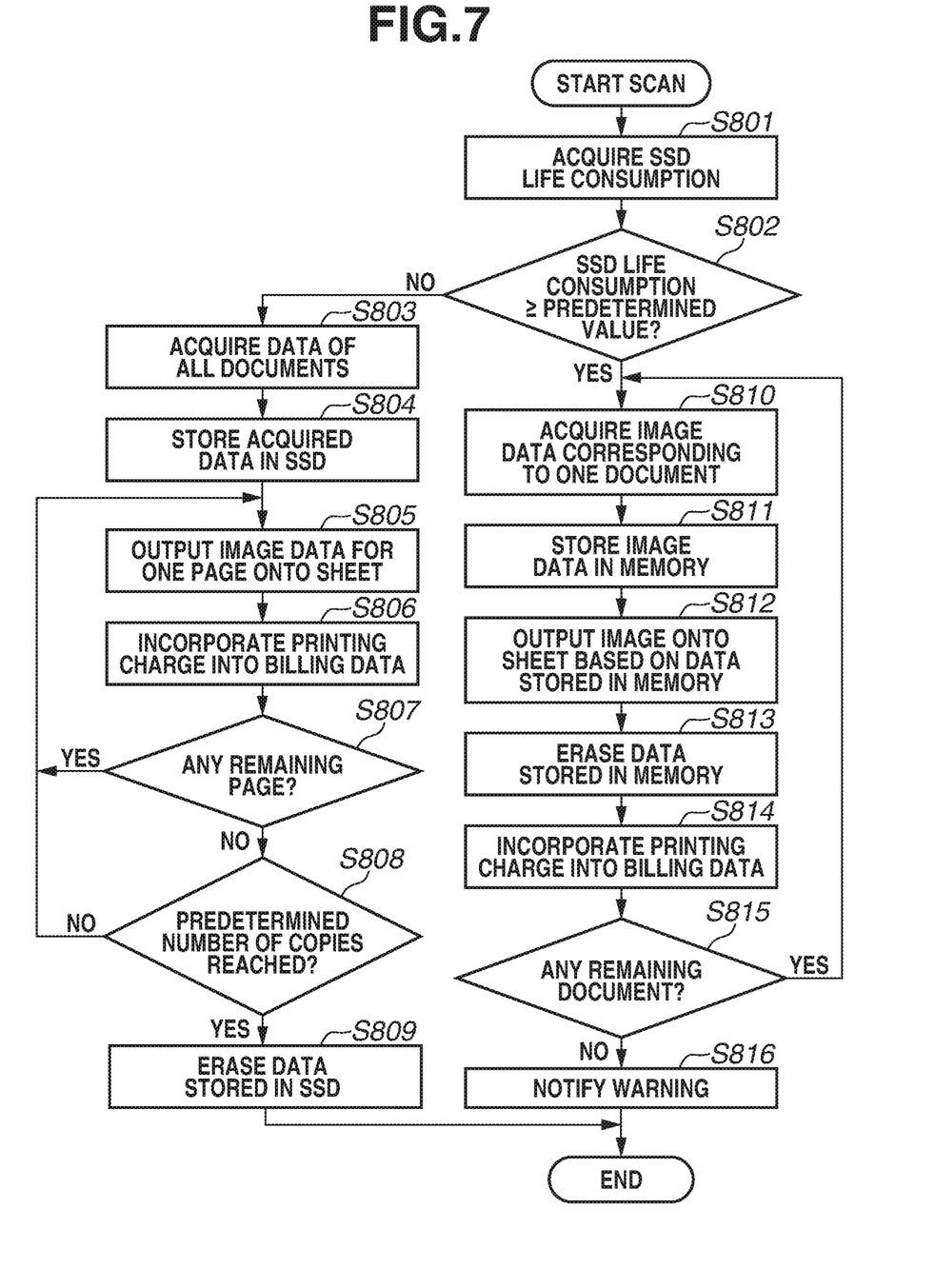
FIG. 7 is a flowchart illustrating print processing.

A flowchart illustrating print processing according to the present exemplary embodiment will be described with reference to FIG. 7. Here, a case where the user makes a plurality of copies of a plurality of documents will be described as an example. A flow in FIG. 7 is executed by the main CPU 201 via the sub-CPU 221.

In step S801, the main CPU 201 acquires the life consumption of the SSD 62 to enable the controller 30 of the image forming apparatus 10 to determine an operating mode after a scan job beings in response to receipt of a user operation by the image forming apparatus 10.

In step S802, the main CPU 201 determines whether the life consumption of the SSD 62 is more than or equal to a predetermined value (e.g., 90%). If the life consumption is less than the predetermined value, the normal operation begins. If the life consumption is more than or equal to the predetermined value, the degeneracy operation begins. The predetermined value may be set beforehand in the image forming apparatus 10, or may be changeable by a service engineer or administrator. The determination is performed based on the life consumption, but may be performed based on whether the remaining life is less than or equal to a predetermined value (e.g., 10%). In that case, if the remaining life is less than or equal to the predetermined value, the processing proceeds to step S810, and if the remaining life is more than the predetermined value, the processing proceeds to step S803.

If the life consumption of the SSD 62 is less than the predetermined value, i.e., in the case of the normal operation (NO in step S802), the processing proceeds to step S803. In step S803, the main CPU 201 causes the scanner device 20 to acquire data of all documents. Subsequently, in step S804, the acquired data is stored in the SSD 62. In step S803 and step S804, since the capacity of the memory 223 is small, image data for one document is temporarily stored in the memory 223, and the stored image data is written to the SSD 62. After the written image data is deleted from the memory 223, the next document is scanned.

In step S805, the main CPU 201 reads out the image data for one page in a sequence from the SSD 62, and outputs the read-out image data onto a sheet. In step S806, the main CPU 201 discharges the sheet, and at the same time, calculates a printing charge and incorporates the calculated printing charge into billing data (charge information). The billing data incorporating the printing charge is stored in the SSD 62. In step S807, the main CPU 201 determines whether one copy job is completed, i.e., if there is any remaining page. If there is any remaining page (YES in step S807), the next page is output (step S805 and step S806 are repeated).

If there is no remaining page (NO in step S807), the processing proceeds to step S808. In step S808, the main CPU 201 determines whether the number of copies set by the user is reached. If the number of copies set by the user is not reached (NO in step S808), the main CPU 201 starts outputting the next copy (step S805 to step S807 are repeated). If the number of copies set by the user is reached, i.e., all the copies are output (YES in step S808), the processing proceeds to step S809. In step S809, the main CPU 201 erases all the data stored in the SSD 62.

On the other hand, if the life consumption of the SSD 62 is more than or equal to the predetermined value, i.e., in the case of the degeneracy operation (YES in step S802), the processing proceeds to step S810. In step S810, the main CPU 201 causes the scanner device 20 to acquire image data corresponding to one document. In step S811, the main CPU 201 stores the acquired image data in the memory 223. In step S812, the main CPU 201 outputs an image onto a sheet based on the data stored in the memory 223. In step S813, the main CPU 201 erases the data stored in the memory 223. In step S814, the main CPU 201 discharges the sheet, and at the same time, calculates a printing charge and incorporates the calculated printing charge into billing data (charge information). The billing data incorporating the printing charge is stored in the SSD 62. In step S815, the main CPU 201 determines whether there is any remaining document not read by the scanner device 20. If there is any remaining document (YES in step S815), step S810 to step S814 are repeated. If there is no remaining document (NO in step S815), the job execution ends, and the processing proceeds to step S816.

In step S816, the main CPU 201 notifies a warning. For example, the main CPU 201 may provide a notification for promoting replacement of the SSD 62 to the service engineer via a network, or may display a screen indicating that the life of the SSD 62 is about to end on the image forming apparatus 10 for the user.

In step S816, the warning may be notified each time the image forming apparatus 10 is used, or may be notified only at a predetermined timing instead of being notified each time the image forming apparatus 10 is used. For example, there may be used a configuration of notifying the warning each time the life of the SSD 62 is consumed for a predetermined amount, or a configuration of notifying the warning when a predetermined user such as an administrator uses the image forming apparatus 10.

Here, the billing data is stored in the SSD 62 in step S814, but the data to be stored is not limited to the billing data. Any type of data may be stored if the data is important data. Further, the important data may be uploaded to a server after being stored in the SSD 62.

In the above-described configuration, it is possible to prevent a situation where the image forming apparatus 10 abruptly stops operating and cannot be used against the user's intention. It is also possible to use the image forming apparatus 10 without losing important data such as the billing information even if the SSD 62 approaches the end of life.

The present exemplary embodiment is described with reference to the configuration in which the image read by the scanner device 20 is printed, but the present exemplary embodiment is not limited to this configuration. For example, the present exemplary embodiment is applicable to a case where image data is received via an external apparatus. Further, the timing of detecting the life of the SSD 62 is not limited to the start of a print job. For example, the detection may be performed after the completion of a print job, at the time of activation, sleep (power save mode) entry/return, or shutdown. Furthermore, once the degeneracy operation begins, the life of the SSD 62 may not be acquired until replacement of the SSD 62 is detected. A flag indicating that the life consumption of the SSD 62 is large may be set beforehand, and the life may be determined with reference to the flag before a print job begins. The detection of the life may be implemented by any of these configurations.

Figure 8:
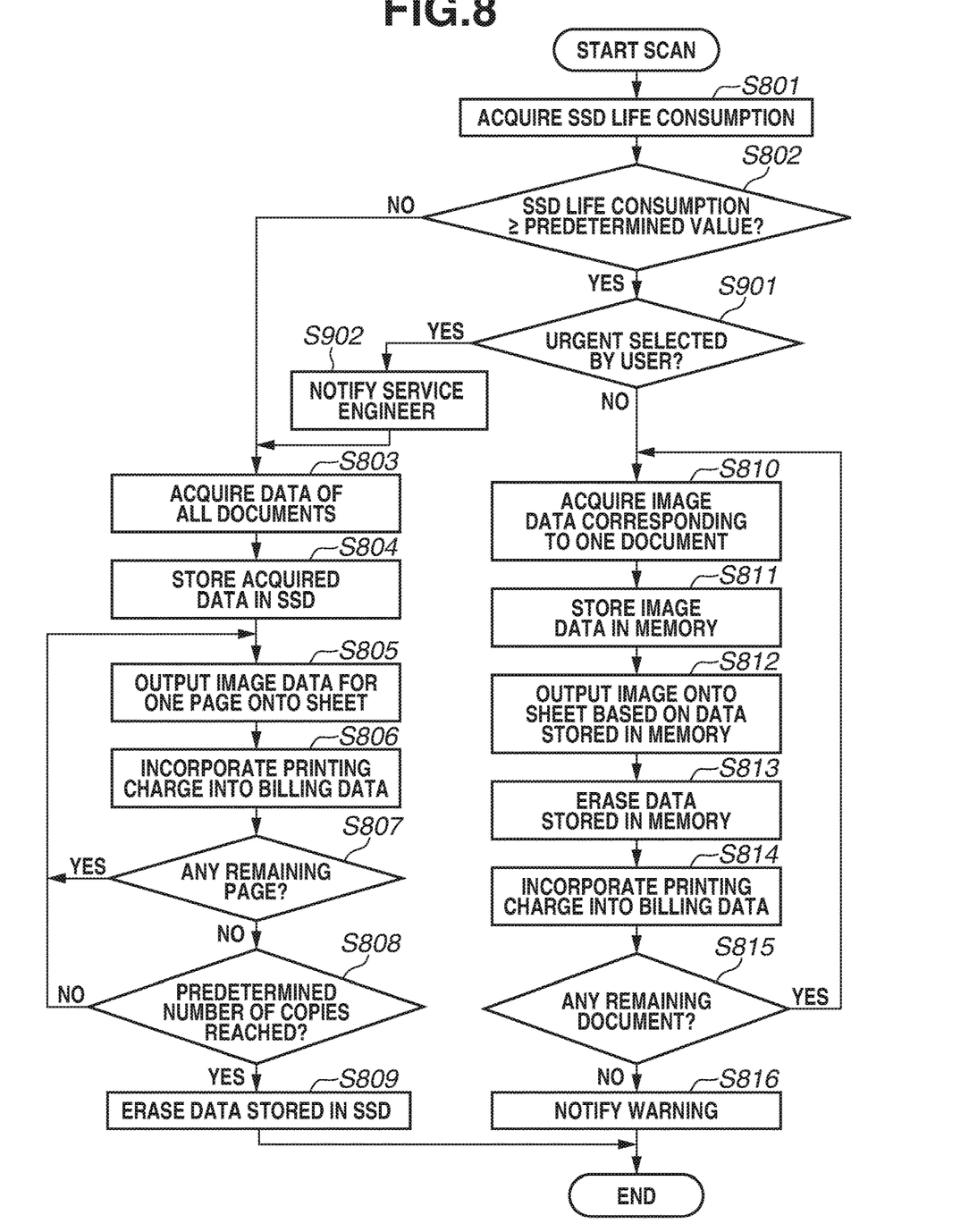
FIG. 8 is a flowchart illustrating print processing.

Next, a second exemplary embodiment will be described with reference to a flowchart representing print processing illustrated in FIG. 8. Steps similar to those of the first exemplary embodiment are provided with the same reference numerals as those thereof and will not be described.

As described in the first exemplary embodiment, the documents are copied one by one in the degeneracy operation (repeating step S810 to step S814). The storage medium in use is the memory 223. Thus, the storage capacity is small, and the image data corresponding to all documents cannot be stored at a time. In other words, only one copy can be printed for one reading of a document by the scanner device 20, and thus repeat reading a plurality of times is performed when a plurality of copies is to be printed (the determination is performed in step S815, and the next copy is output in step S810 to step S812). Thus, productivity in the degeneracy operation is much lower than in the normal operation.

In the present exemplary embodiment, if the life consumption is more than or equal to the predetermined value (YES in step S802), the processing proceeds to step S901. In step S901, the main CPU 201 determines whether "urgent" is selected by the user. If the user selects "urgent", the normal operation begins. If the user selects "not urgent", the degeneracy operation begins. Options in step S901 are not limited to this example, and the user may select either the normal operation or the degeneracy operation to begin on a screen of the image forming apparatus 10. The options may be expressed in any form as long as either the degeneracy operation or the normal operation is selected at least as a result.

The selection may be made each time the consumption life of the SSD 62 is more than a predetermined value, or a setting selected once may be incorporated until the life of the SSD 62 ends. Further, instead of the selection being made using the execution of a print job as a trigger, action to be taken when the consumption life becomes more than or equal to a threshold may be set beforehand as a setting of the image forming apparatus 10.

If the user selects "urgent", i.e., the execution of the normal operation (YES in step S901), the processing proceeds to step S902. In step S902, the main CPU 201 notifies a service engineer that the consumption life of the SSD 62 is more than or equal to the predetermined value. Subsequently, in step S803 to step S809, the main CPU 201 executes the print job in the normal operation.

The reason for notifying the service engineer in step S902 is that, since the SSD 62 is normally used despite the fact that the SSD 62 is approaching the end of life, the image forming apparatus 10 is highly likely to stop operating very soon at the end of the life of the SSD 62. Thus, it may be desirable to take action immediately.

On the other hand, if the user selects "not urgent", i.e., the execution of the degeneracy operation (NO in step S901), the degeneracy operation is executed in a manner similar to that described in the first exemplary embodiment in step S810 to step S814.

In the above-described configuration, it is possible to prevent the situation where the image forming apparatus 10 abruptly stops operating and cannot be used against the user's intention. It is also possible to use the image forming apparatus 10 without losing important data such as the billing information even if the SSD 62 approaches the end of life. Further, it is also possible to operate the image forming apparatus 10 based on needs of the user.

In a case where the service engineer is dispatched and the SSD is replaced, previous settings can be restored by copying data from the old SSD. Further, in a case where data such as important data (e.g., billing, settings) is uploaded beforehand to a server, the data can also be restored from the server at the time of replacement of the SSD.

Various examples and exemplary embodiments of the disclosure have been described above, but the gist and the scope of the disclosure are not limited to the specific description in the present specification.

The aspect of the embodiments can also be implemented by supplying a program that implements one or more functions of the above-described exemplary embodiments to a system or an apparatus via a network or a storage medium, and causing one or more processors in a computer of the system or the apparatus to read out the program and execute the read-out program. The aspect of the embodiments can also be implemented by a circuit (e.g., an application-specific integrated circuit (ASIC)) for implementing the one or more functions.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-141509, filed Jul. 31, 2019, which is hereby incorporated by reference herein in its entirety.

What is claimed is:

1. An apparatus including a volatile memory and a non-volatile storage with a limited number of writes, the apparatus comprising:
a printer configured to execute printing based on image data; and
a controller having one or more processors which execute instructions stored in one or more memories including the memory, the controller being configured to:
acquire information about a number of writes of the storage, and
switch between a first operating mode and a second operating mode based on the information about the number of writes,
wherein the first operating mode is a mode of, when printing is executed by the printer, storing the image data into the storage and then reading out the image data stored in the storage to cause the printer to execute the printing, and
wherein the second operating mode is a mode of, when printing is executed by the printer, storing the image data into the memory and not storing the image data into the storage and then reading the image data out of the memory to cause the printer to execute the printing.

2. The apparatus according to claim 1, wherein, in a case where the information about the number of writes indicates a number of writes to the storage, the controller switches from the first operating mode to the second operating mode based on the information about the number of writes becoming more than or equal to a predetermined value.

3. The apparatus according to claim 2, wherein the controller is configured to:
prompt a user to select a setting about an operating mode based on the information about the number of writes becoming more than or equal to a predetermined value,
not switching from the first operating mode to the second operating mode in a case where a setting indicating operation in the first operating mode is selected, and
switch from the first operating mode to the second operating mode in a case where a setting indicating operation in the second operating mode is selected.

4. The apparatus according to claim 1, further comprising a display,
wherein the display notifies a user of a warning based on the information about the number of writes becoming more than or equal to a predetermined value.

5. The apparatus according to claim 1, further comprising a network,
wherein the network notifies a service engineer of a warning based on the information about the number of writes becoming more than or equal to a predetermined value.

6. The apparatus according to claim 1, wherein the controller switches from the first operating mode to the second operating mode in a case where the information about the number of writes indicates a remaining life of the storage based on the remaining life becoming less than or equal to a predetermined value.

7. The apparatus according to claim 6, further comprising a display,
wherein the display notifies a user of a warning based on the information about the number of writes becoming less than or equal to a predetermined value.

8. The apparatus according to claim 6, further comprising a network,
wherein the network notifies a user of a warning based on the information about the number of writes becoming less than or equal to a predetermined value.

9. The apparatus according to claim 6, wherein the controller is configured to:
prompt a user to select a setting about an operating mode based on the information about the number of writes becoming less than or equal to a predetermined value,
not switching from the first operating mode to the second operating mode in a case where a setting indicating operation in the first operating mode is selected, and
switch from the first operating mode to the second operating mode in a case where a setting indicating operation in the second operating mode is selected.

10. The apparatus according to claim 1, further comprising a scanner configured to read a document and generate image data based on the read document,
wherein, in the first operating mode, the scanner sequentially reads a plurality of documents and generates a plurality of pieces of image data based on the read plurality of documents, the storage stores the generated plurality of pieces of image data, and the printer executes printing based on the stored plurality of pieces of image data.

11. The apparatus according to claim 10, wherein, in the second operating mode, the scanner reads one document and generates one piece of image data based on the read one document, the memory stores the generated one piece of image data, the printer executes printing based on the stored one piece of image data, the memory erases the one piece of image data based on printing executed by the printer, and the scanner starts reading a document subsequent to the one document based on erasure of the one piece of image data.

12. The apparatus according to claim 1,
wherein the controller calculates a printing charge based on printing executed by the printer, and
wherein the controller stores charge information incorporating the printing charge in the storage in the first operating mode and the second operating mode.

13. The apparatus according to claim 1, wherein the controller stores user setting information in the storage in the first operating mode and the second operating mode.

14. The apparatus according to claim 1, wherein the memory is a random access memory.

15. The apparatus according to claim 1, wherein the storage is a solid state drive.

16. A method of an apparatus including a volatile memory, a nonvolatile storage with a limited number of writes, and a printer configured to execute printing based on image data, the method comprising:
  acquiring information about a number of writes of the storage; and
  switching between a first operating mode and a second operating mode based on the information about the number of writes,
  wherein the first operating mode is a mode of, when printing is executed by the printer, storing the image data into the storage and then reading out the image data stored in the storage to cause the printer to execute the printing, and
  wherein the second operating mode is a mode of, when printing is executed by the printer, storing the image data into the memory and not storing the image data into the storage and then reading the image data out of the memory to cause the printer to execute the printing.

17. The method according to claim 16, wherein, in a case where the information about the number of writes indicates a number of writes to the storage, switching from the first operating mode to the second operating mode is performed based on the information about the number of writes becoming more than or equal to a predetermined value.

18. The method according to claim 16, further comprising notifying a user of a warning based on the information about the number of writes becoming more than or equal to a predetermined value.

19. The method according to claim 16, further comprising notifying a service engineer of a warning based on the information about the number of writes becoming more than or equal to a predetermined value.

20. The method according to claim 16, further comprising storing user setting information in the storage in the first operating mode and the second operating mode.

* * * * *